United States Patent [19]

McGrew, Jr.

[11] Patent Number: 5,549,818
[45] Date of Patent: Aug. 27, 1996

[54] SEWAGE TREATMENT SYSTEM

[76] Inventor: Henry E. McGrew, Jr., 9591 Wallace Lake Rd., Shreveport, La. 71101

[21] Appl. No.: 423,531

[22] Filed: Apr. 17, 1995

[51] Int. Cl.$^6$ .................................................. C02F 3/20
[52] U.S. Cl. ..................... 210/195.4; 210/220; 210/256
[58] Field of Search ........................... 210/195.3, 195.4, 210/202, 220, 256, 259, 197

[56] References Cited

U.S. PATENT DOCUMENTS

| | | | |
|---|---|---|---|
| 3,883,427 | 5/1975 | Oldham et al. | 210/195.4 |
| 3,923,605 | 12/1975 | Gedde | 210/256 |
| 4,650,577 | 3/1987 | Hansel | 210/195.3 |
| 4,983,285 | 1/1991 | Nolen | 210/197 |
| 5,032,276 | 7/1991 | Mackrle et al. | 210/195.3 |
| 5,196,114 | 3/1993 | Burwell | 210/195.3 |
| 5,221,470 | 6/1993 | McKinney | 210/195.4 |

*Primary Examiner*—Christopher Upton
*Attorney, Agent, or Firm*—John M. Harrison

[57] ABSTRACT

A sewage treatment system which includes a cylindrical treatment tank fitted with an air distribution system and an inverted, cone-shaped clarifier, wherein air is supplied to the aeration chamber of the treatment tank through the air distribution system by means of a compressor. The treatment tank is normally installed below the surface of the ground and the air distribution system includes downwardly-extending air drop lines, the plugged ends of which project at or below the plane of the bottom open end of the cone-shaped clarifier. The drop lines are provided with spaced air openings which face the clarifier and are located above the plane of the bottom open end of the clarifier, to facilitate optimum diffusion of air into the aeration chamber toward the clarifier from the drop lines, responsive to operation of the compressor.

18 Claims, 1 Drawing Sheet

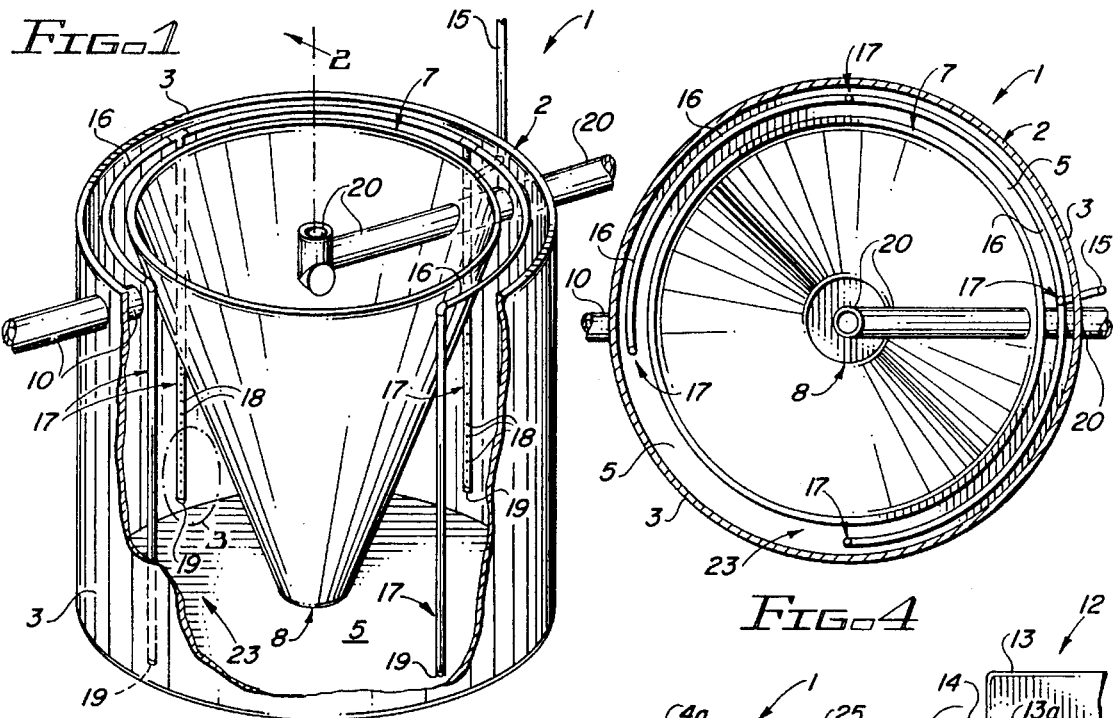
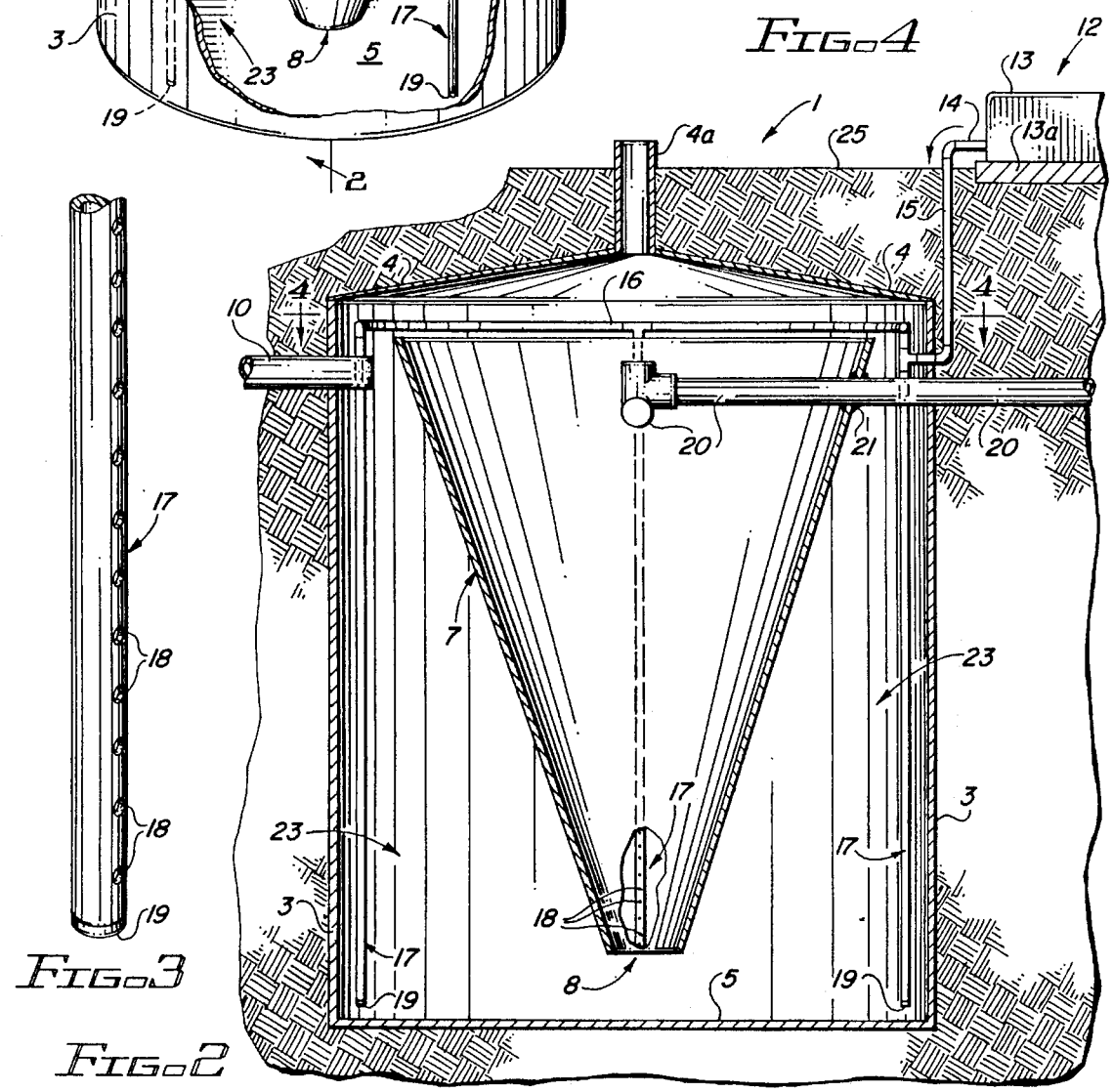

SEWAGE TREATMENT SYSTEM

BACKGROUND OF THE INVENTION

FIELD OF THE INVENTION

This invention relates to treatment of sewage and more particularly, to the treatment of sewage by aeration using a cylindrical treatment tank with a specially designed system of perforated air drop lines which eliminates the requirement of a conventional deflector located at the bottom of the treatment tank and extending into the small, open end of an inverted, cone-shaped clarifier. A unique air drop line design which includes linearly-spaced drop line openings for diffusing air from the drop lines into the aeration zone or chamber of the treatment tank in an optimum manner, faciliates withdrawal of effluent of extremely high quality from the quiet or quiescent zone at the flared, open top of the clarifier. In a preferred embodiment of the invention the spaced drop line openings face each other and the clarifier and are designed to minimize the coalescence of air bubbles and optimize contact of the bubbled air with the bacteria-laden effluent in the aeration zone, to optimize the quality of the effluent removed from the top of the clarifier in the quiescent zone.

Conventional sewage treatment systems normally include a sewage treatment tank of selected design, which tank is generally constructed of a cylindrical outer mixing tank and a center-located, invented funnel settling chamber called a clarifier. Raw, unsettled waste water and solid waste from a residence or business enters the aeration chamber of the mixing tank, which is located between the tank wall and the clarifier, where simple hydraulic displacement is accomplished by the introduction of air that promotes the growth of aerobic organisms in much larger colonies than would occur naturally. These organisms break down the organic solids in the waste water, producing inorganic and stable organic solids. Air is normally introduced into these tanks through vertical drop lines to effect the desired aeration and this aeration provides dissolved oxygen in the effluent, mixing of the waste water and sufficient time for the organisms or bacteria to break down the organic solids that have entered the treatment plant. From the mixing tank aeration chamber, mixed liquid enters the cone-shaped settling chamber, or clarifier, from a small opening in the bottom. No mixing occurs in this quiet or quiescent zone, where solids separate from the liquid, settle through the opening in the bottom of the clarifier, re-enter the mixing chamber and collect on the bottom of the treatment tank. The liquid that separates from the solids in the clarifier continues to flow hydraulically upwardly to the effluent discharge pipe. This liquid is typically a clear, odorless effluent discharge which meets or exceeds state water quality standards, and the objective of all sewage treatment systems is to produce an effluent having a desirable suspended solids content, biological oxygen demand (BOD) and dissolve oxygen (DO) content. When a new system is installed, it is typically located below ground at a sufficient elevation that will facilitate the necessary fall to effect a gravity flow of sewage from the home or business into the tank. A compressor is placed above ground in a suitable housing or enclosure for supplying air to the air distribution system and the air pumped from the compressor is typically bubbled through the effluent from the open-ended air drop lines in the treatment tank. The tank is initially filled with clear water and is then ready for operation.

It is an object of this invention to provide a new and improved sewage treatment system which utilizes multiple air drop lines of unique perforated design to effect an optimum biological balance in the treatment tank and an effluent of exceptionally good quality which is pumped from the treatment tank for disposal.

Another object of this invention is to provide a sewage treatment system which includes a cylindrical treatment tank that does not need or contain a deflector plate or solids deflection system and instead, incorporates plugged and perforated air drop lines of unique design, which perforations are characterized by multiple, linearly-spaced openings facing the clarifier to facilitate optimum distribution of air into the turbulent zone or aeration chamber of the treatment tank and promote oxygenation of the water, optimize the growth of bacteria and produce an effluent of exceptionally good quality at the top of the clarifier.

Still another object of this invention is to provide a new and improved sewage treatment system that uses a treatment tank having a cylindrical wall fitted with four drop lines plugged at the ends and equally spaced around the tank circumference and having multiple, linearly-spaced air discharge openings facing the clarifier, which air discharge openings are located above the level of the small, open end of the clarifier to eliminate the need for a conventional deflector plate in the treatment tank and optimize the dissolved oxygen (DO) content, biological oxygen demand (BOD) and suspended solids of the water pumped or flowing from the clarifier.

A still further object of the invention is to provide a sewage treatment system which is characterized by a cylindrical, sub-surface treatment tank having four downwardly-extending air drop lines connected to an air distribution system, each of which drop lines is characterized by a plug in the bottom end and five air openings provided on one-inch linear centers, for introducing air into the turbulent or aeration zone or chamber of the treatment tank between the tank wall and the clarifier, at an optimum rate and bubble distribution to optimize the dissolved oxygen content of the water in the tank, faciliate handling a wide variety of organic loading and achieve an optimum biological balance in the treatment tank.

SUMMARY OF THE INVENTION

These and other objects of the invention are provided in a new and improved sewage treatment system and a home sewage treatment system in particular, which system includes a cylindrical, sub-surface treatment tank fitted with an air distribution system having four, vertically-oriented air drop lines, plugged at the bottom and equally spaced around the perimeter of the treatment tank. Five air openings are linearly provided in each of the drop lines on one-inch, spaced centers with respect to each other and facing the small bottom end of the open-ended clarifier, to eliminate the need for a conventional deflection plate in the clarifier and introduce air into the water in the treatment tank in an optimum manner. Bubbling of air from the air openings through the effluent in the turbulent zone or aeration chamber of the treatment tank facilitates effluent of exceptionally good quality; for example, seven parts per million of suspended solids, a biological oxygen demand of 7.0 and a dissolved oxygen content in the range of from about 1.5 to 3.0 parts per million.

BRIEF DESCRIPTION OF THE DRAWING

The invention will be better understood by reference to the accompanying drawing, wherein:

FIG. 1 is a perspective view of a preferred embodiment of the treatment tank element of the sewage treatment system of this invention, with the treatment tank top removed;

FIG. 2 is a sectional view, taken along line 2—2 of the treatment tank illustrated in FIG. 1;

FIG. 3 is an enlarged view, partially in section, of the bottom segment of a typical air drop line, more particularly illustrating five air openings provided in linearly spaced relationship with respect to each other in the drop line; and FIG. 4 is a sectional view, taken along line 4—4 of the treatment tank illustrated in FIG. 2.

DESCRIPTION OF THE PREFERRED EMBODIMENTS

Referring initially to FIGS. 1–3 of the drawing, the sewage treatment system of this invention is generally illustrated by reference numeral 1. A primary element of the sewage treatment system 1 is the sub-surface treatment tank 2, which is characterized by a continuous cylindrical tank wall 3, fitted with a conical tank top 4, having a vent 4a, extending above the ground level 25. A tank bottom 5 closes the bottom of the treatment tank 2 and an inverted, cone-shaped clarifier 7 is provided in the treatment tank 2, with a clarifier opening 8 provided at the small bottom end of the clarifier 7, facing and spaced from the tank bottom 5. A sewage inlet line 10 is provided in the tank wall 3 of the treatment tank 2 near the point where the tank top 4 joins the tank wall 3 and the sewage inlet line 10 introduces raw sewage into the turbulent zone or aeration chamber 23 of the treatment tank 2. An effluent discharge line 20 is provided in the top of the tank wall 3 opposite the sewage inlet line 10 and is sealed by means of a discharge line seal 21 in the wall of the clarifier 7, to facilitate pumping or gravity flow of effluent from the quiescent zone 24 located inside the clarifier 7, for disposal in any desired manner. An air distribution system 12 is provided in the treatment tank 2 and includes an air distribution line 16, which extends around a portion of the perimeter of the treatment tank 2 and the clarifier 7 beneath the tank top 4, rests on the sewage inlet line 10 and effluent discharge line 20 and joins four, downwardly-extending, vertical air drop lines 17. The air drop lines 17 are provided in equally spaced relationship along the inside periphery of the tank wall 3, as illustrated in FIGS. 1, 3, and 4. The air drop lines 17 are also each fitted with a drop line plug 19 and five, linearly-spaced drop line openings 18, as illustrated in FIGS. 1, 2 and 3, which drop line openings 18 face each other and the clarifier 7, to facilitate bubbling of air through the aeration chamber 23 in the treatment tank 2, effect aeration of the effluent in the aeration chamber 23 and promote the growth of bacteria. An air supply line 15 connects the air distribution line 16 to a compressor discharge 14, which is, in turn, connected to the above-ground compressor 13, mounted on a compressor pad 13a. Operation of the compressor 13 thus supplies air to the air drop lines 17 through the compressor discharge 14, air supply line 15 and air distribution line 16, at a selected pressure and facilitates the bubbling of air through the respective drop line openings 18 for the purpose described above.

It has surprisingly been found that the provision of drop line openings 18 in vertically spaced, linear relationship with respect to each other, with the drop line openings 18 in each of the air drop lines 17 each positioned above the plane of the clarifier opening 8 at the small end of the clarifier 7, produces an effluent at the opposite, large end of the clarifier 7 and the effluent discharge line 20, of superior quality. For example, in a conventional sewage treatment system, the treated effluent flowing from the effluent discharge line in a typical treatment tank typically contains about 15 to 18 parts per million suspended solids, a biological oxygen demand of about 15 to 18 and less than one part per million dissolved oxygen. However, under circumstances where the drop line openings 18 of this invention are vertically and linearly spaced in the air drop lines 17 as described above, the effluent at the effluent discharge line 20 has been found to consistently contain about 7 parts per million suspended solids, with a biological oxygen demand of 7 and a dissolved oxygen content of from 1.5 to 3.0 parts per million. Furthermore, it has also been found that provision of the perforated air drop lines 17 in the air distribution line 16 as described above eliminates the necessity for a conventional deflector plate (not illustrated) which is normally placed in the tank bottom 5 of the treatment tank 2 and extends upwardly through the clarifier opening 8 of the clarifier 7, to guide solid material into the clarifier opening 8, where it continually settles and as the clarified water rises. However, it has been surprisingly found that such a turbulent condition at the tank bottom 5 and clarifier opening 18 is unnecessary, and indeed, is detrimental to a superior clarified water condition at the top of the clarifier 7 and the effluent discharge line 20. In fact, forcing air through the bottom of the air drop lines 17 in conventional fashion is frequently an undesirable technique for obtaining an optimum clarified water condition at the intake of the effluent discharge line 20, since the continuous flow of air from the single opening at the end of each conventional air drop line 17 tends to coaelesce into one or more large air bubbles, which rises as such through the effluent, thereby presenting minimal air-to-water contact and minimal dissolved oxygen in the water. However, air dispersed through the linearly-arranged drop line openings 18 in the plugged air drop line 17 of this invention as described above, divides the air stream, thus dispersing the air bubbles and facilitates a much more efficient air-to-water contact and a correspondingly higher oxygen transfer, thereby better promoting the growth of bacteria and causing the sewage treatment system to operate more efficiently.

Another problem inherent in the conventional system where four air drop lines are typically provided with no drop line plugs 19 and drop line openings 18, has been found where the treatment tank is not level and the unplugged air discharge end or ends of one or more of the conventional air drop lines are therefore disposed higher or lower than the remaining drop lines. Under these circumstances, most of the air tends to flow from the discharge ends of those drop lines which are higher than the opposing discharge ends of the remaining drop lines, since the water pressure is less at the more shallow depth and this condition exacerbates the undesirable poor air-effluent contact in the treatment tank. This aeration problem in conventional sewage treatment systems is eliminated under circumstances where the ends of the drop lines 17 are closed with the drop line plugs 19 and the linearly-arranged drop line openings 18 are provided, because experiments have shown that regardless of tilt or settling of the sub-surface treatment tank 2 after installation, air continues to flow in a substantially even distribution through the respective drop line openings 18 and the air drop lines 17.

It will be further appreciated by those skilled in the art that the size and number of sewage inlet lines 10, effluent discharge lines 20 and air drop lines 17 of the sewage treatment system 1 of this invention may vary. However, in a most preferred embodiment of the invention, four equally-spaced air drop lines 17 are provided, with five drop line openings 18 spaced from each other in linear relationship and arranged in facing relationship with respect to the clarifier 7. The drop line openings 18 are preferably located from about one-half inch to about three inches apart and are most preferably located on one-inch centers and range in size from about 1/16 of an inch to 1/8 of an inch in diameter. The air drop lines 17 are typically PVC pipe having a diameter of one-half inch, with a schedule 40 wall thickness for the 500, 600 and 750 gallons per day of processed effluent treatment tanks 2. Under circumstances where the treatment tanks 2 are larger and the processed effluent is 1000 gallons or 1500 gallons per day, the air drop lines 17 are preferably 3/4 of an inch in diameter and the drop line openings 18 range from about 1/16 of an inch to about 1/8 of an inch in diameter.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A sewage treatment system for processing sewage, comprising a cylindrical treatment tank having a bottom, for containing sewage; an inverted funnel-shaped clarifier provided in said treatment tank and an opening provided in said clarifier, said opening facing said bottom of said treatment tank; at least one sewage inlet line provided in said treatment tank for introducing sewage into said treatment tank; at least one effluent discharge line provided in said treatment tank and terminating in said clarifier for withdrawing effluent from said clarifier; a blower for supplying air to said treatment tank; at least two substantially vertical air drop lines connected in air-distributing relationship to said blower; a plug provided in each of the air drop lines; and a plurality of drop line openings provided in linearly spaced relationship with respect to each other in each of said air drop lines, said drop line openings facing said clarifier, whereby air from said blower is emitted from said drop line openings in the form of discreet bubbles which rise through the sewage in said treatment tank.

2. The sewage treatment system of claim 1 comprising a top provided on said treatment tank and a vent provided in said top, said vent communicating with the interior of said treatment tank for venting the interior of said treatment tank.

3. The sewage treatment system of claim 1 wherein said at least two air drop lines comprises four air drop lines located around the perimeter of said treatment tank in substantially equally-spaced relationship with respect to each other.

4. The sewage treatment system of claim 1 wherein said plurality of drop line openings in said air drop lines comprises five drop line openings spaced in the range of from about one-half inch to about three inches with respect to each other.

5. The sewage treatment system of claim 1 wherein:
   (a) said at least two air drop lines comprises four air drop lines located around the perimeter of said treatment tank in substantially equally-spaced relationship with respect to each other; and
   (b) said plurality of drop line openings in said air drop lines comprises five drop line openings spaced in the range of from about one-half inch to about three inches with respect to each other.

6. The sewage treatment system of claim 5 wherein said treatment tank is located below ground level and comprising a top provided on said treatment tank and a vent provided in said top, said vent communicating with the interior of said treatment tank and extending above ground level for venting the interior of said treatment tank.

7. A sewage treatment system for processing effluent of high quality, comprising a treatment tank having a cylindrical wall, a bottom and a conical top and a vent provided in said top, said treatment tank disposed beneath ground level with said vent communicating with the interior of said treatment tank and projecting above ground level; an inverted funnel-shaped clarifier provided in said treatment tank and an opening provided in said clarifier, said opening facing said bottom of said treatment tank and spaced from said bottom; at least one sewage inlet line provided in said treatment tank for introducing raw sewage into said treatment tank between said cylindrical wall and said clarifier; at least one effluent discharge line provided in said treatment tank and said clarifier for withdrawing effluent from said clarifier; a compressor located above ground level for supplying air to said treatment tank; and a plurality of substantially vertical air drop lines having one end connected in air-supply relationship to said compressor, a plurality of drop line openings provided in said air drop lines and a plug provided in the opposite end of said air drop lines, respectively, said air drop lines disposed along said cylindrical wall in spaced, relationship with respect to each other, with said opposite end of said air drop lines facing said bottom of said treatment tank and said drop line openings facing said clarifier, whereby air is pumped through said air drop lines and said drop line openings for bubbling air through the effluent in said treatment tank responsive to operation of said compressor.

8. The sewage treatment system of claim 7 wherein said plurality of air drop lines comprises four air drop lines disposed substantially equidistant from each other in said treatment tank.

9. The sewage treatment system of claim 7 wherein said drop line openings are provided in said air drop lines in linearly-shaped relationship and said drop line openings are disposed above the plane of said clarifier opening.

10. The sewage treatment system of claim 7 wherein said plurality of air drop lines comprises four air drop lines disposed substantially equidistant from each other in said treatment tank and said drop line openings are provided in said air drop lines in linearly-spaced relationship and said drop line openings are disposed above the plane of said clarifier opening.

11. The sewage treatment system of claim 10 wherein said drop line openings are linearly spaced from each other a distance of from about one-half of an inch to about three inches.

12. The sewage treatment system of claim 11 wherein said distance is about one inch.

13. The sewage treatment system of claim 10 wherein said plurality of drop line openings comprises five drop line openings.

14. The sewage treatment system of claim 13 wherein said drop line openings are spaced on about one-inch centers with respect to each other.

15. A sewage treatment system for processing sewage and producing effluent of high quality, comprising a treatment tank having a cylindrical wall, a substantially flat bottom and a conical top having a vent, said treatment tank disposed beneath ground level with said vent extending above ground level for venting the interior of said treatment tank; an inverted funnel-shaped clarifier provided in said treatment tank and an opening provided in said clarifier, said opening facing said bottom of said treatment tank and spaced from said bottom of said treatment tank; a sewage inlet line provided in said treatment tank for introducing raw sewage into said treatment tank between said cylindrical wall and said clarifier; an effluent discharge line provided in said treatment tank and said clarifier for withdrawing effluent from the top of said clarifier; a compressor located above ground level for supplying air to said treatment tank; a plurality of substantially vertical air drop lines having one end connected in air-supply relationship to said compressor; a plurality of drop line openings provided in said air drop lines in linearly-spaced relationship with respect to each other, said drop line openings disposed above the plane of said clarifier opening; and a plug provided in the opposite end of said air drop lines, respectively, said air drop lines disposed along said cylindrical wall in spaced relationship with respect to each other, with said opposite end of said air drop lines facing said bottom of said treatment tank, whereby air is pumped through said air drop lines and said drop line openings for bubbling air through the effluent in said treatment tank responsive to operation of said compressor.

16. The sewage treatment system of claim 15 wherein said plurality of air drop lines comprises four air drop lines disposed substantially equidistant from each other in said treatment tank.

17. The sewage treatment system of claim 15 wherein said plurality of drop line openings comprises five drop line openings spaced on substantially one-inch centers.

18. The sewage treatment system of claim 15 wherein:
 (a) said plurality of air drop lines comprises four air drop lines disposed substantially equidistant from each other in said treatment tank; and
 (b) said plurality of drop line openings comprises five drop line openings spaced on substantially one-inch centers.

* * * * *